(12) United States Patent
Matsumoto et al.

(10) Patent No.: US 11,304,050 B2
(45) Date of Patent: Apr. 12, 2022

(54) NODE APPARATUS IN A NETWORK, CONTROL METHOD THEREOF, AND STORAGE MEDIUM FOR CONTROL OF PAGING POLICY

(71) Applicant: KDDI CORPORATION, Tokyo (JP)

(72) Inventors: Nobutaka Matsumoto, Fujimino (JP); Takeshi Kitahara, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 2 days.

(21) Appl. No.: 16/776,678

(22) Filed: Jan. 30, 2020

(65) Prior Publication Data

US 2020/0169866 A1 May 28, 2020

Related U.S. Application Data

(63) Continuation of application No. PCT/JP2018/018838, filed on May 16, 2018.

(30) Foreign Application Priority Data

Sep. 29, 2017 (JP) .............................. JP2017-190864

(51) Int. Cl.
*H04W 8/08* (2009.01)
*H04W 36/32* (2009.01)
(Continued)

(52) U.S. Cl.
CPC ........... *H04W 8/08* (2013.01); *H04W 12/033* (2021.01); *H04W 12/0431* (2021.01);
(Continued)

(58) Field of Classification Search
CPC . H04W 8/08; H04W 12/033; H04W 12/0431; H04W 36/32; H04W 60/00;
(Continued)

(56) References Cited

U.S. PATENT DOCUMENTS 9,277,529 B2   3/2016   Godin et al.
9,986,458 B2   5/2018   Park et al.
(Continued)

FOREIGN PATENT DOCUMENTS

JP   2008-193592 A   8/2008
JP   2016-514935 A   5/2016
(Continued)

OTHER PUBLICATIONS

International Search Report for PCT/JP2018/018838 dated Jul. 17, 2018.
(Continued)

*Primary Examiner* — Michael Y Mapa
(74) *Attorney, Agent, or Firm* — Thomas | Horstemeyer, LLP

(57) ABSTRACT

An MEC node, by analyzing signaling information transmitted between each of a plurality of eNBs and an MME, collects at least one of information indicating a mobility state and information indicating a communication state of a UE present within cells of the plurality of base stations. The MEC node decides a paging range based on the information collected as above upon receiving a paging message for paging the UE, the paging message having been transmitted by MME to one or more eNBs in accordance with a predetermined paging policy. The MEC node transmits a paging message for paging the UE to each eNB present in the decided paging range.

14 Claims, 12 Drawing Sheets

(51) Int. Cl.
*H04W 60/00* (2009.01)
*H04W 68/00* (2009.01)
*H04W 12/033* (2021.01)
*H04W 12/0431* (2021.01)

(52) U.S. Cl.
CPC ........... *H04W 36/32* (2013.01); *H04W 60/00* (2013.01); *H04W 68/005* (2013.01)

(58) Field of Classification Search
CPC . H04W 68/005; H04W 12/121; H04W 12/03; H04W 12/047; H04W 60/04; H04W 92/14; H04W 68/04
USPC .................................. 455/436–444; 370/331
See application file for complete search history.

(56) References Cited

U.S. PATENT DOCUMENTS

| | | | |
|---|---|---|---|
| 10,212,693 B2 | 2/2019 | Agarwal et al. | |
| 10,433,153 B2 | 10/2019 | Uchiyama | |
| 10,701,668 B2 | 6/2020 | Agarwal et al. | |
| 2004/0157626 A1* | 8/2004 | Park | H04W 60/00 455/458 |
| 2008/0162924 A1* | 7/2008 | Chinitz | H04L 63/20 713/153 |
| 2014/0302880 A1 | 10/2014 | Godin et al. | |
| 2015/0215742 A1 | 7/2015 | Ikeda et al. | |
| 2016/0128020 A1* | 5/2016 | Agarwal | H04W 8/02 370/328 |
| 2017/0064579 A1 | 3/2017 | Park et al. | |
| 2017/0238278 A1* | 8/2017 | Yadav | H04W 68/04 370/329 |
| 2018/0146360 A1 | 5/2018 | Uchiyama | |
| 2019/0045409 A1* | 2/2019 | Rasanen | H04W 36/36 |
| 2019/0182804 A1 | 6/2019 | Agarwal et al. | |

FOREIGN PATENT DOCUMENTS

| | | |
|---|---|---|
| WO | 2014/049911 A1 | 4/2014 |
| WO | 2016073384 A1 | 5/2016 |
| WO | 2016/203874 A1 | 12/2016 |
| WO | 2019064680 A1 | 4/2019 |

OTHER PUBLICATIONS

Vodafone Group Plc., Potential collaboration on Mobile-Edge Computing, 3GPP TSG RAN WG2 Meeting #89 R2-1 50004, Feb. 9-13, 2015, Athens, Greece.

European Search Report for European Patent Application No. 18862786.3. dated Sep. 30, 2020.

Pavel Mach et al: "Mobile Edge Computing: A Survey on Architecture and Computation Offloading", IEEE Communications Surveys and Tutorials, Jan. 1, 2017 (Jan. 1, 2017), pp. 1628-1656, XP055408968, DOI: 10.1109/COMST.2017.2682318 Retrieved from the Internet: URL: https://arxiv.org/pdf/1702.05309.pdf.

Cisco: "MEC Location Management @BULLET Feature Summary and Revision History, on p. 1 @BULLET Feature Description, on p. 2 @BULLET How It Works, on p. 2 @BULLET Configuring MEC Support, on p. 5 @BULLET Monitoring and Troubleshooting, on p. 7 Feature Summary and Revision History Summary Data MME Ap", Jun. 10, 2016(Jun. 10, 2016), pp. 1-10, XP055732326, Retrieved from the Internet: URL: https://www.cisco.com/c/en/us/td/docs/wireless/asr_5000/21-16_6-10/RCR/21-16_6-10-Change-Reference/21-16_6-10_chapter_0101.pdf[retrieved on Sep. 21, 2020].

* cited by examiner

FIG. 4A

BASE STATION INFORMATION

| BASE STATION (eNB) | TAI | HANDLING MEC NODE |
|---|---|---|
| 0xppppppp | 0xSSSS | MEC-A |
| 0xssssssss | 0xTTTT | MEC-B |
| 0xqqqqqqqq | 0xUUUU | MEC-C |

FIG. 4B

ADJACENT MEC NODE INFORMATION

| MEC NODE | HANDLING MME | IP ADDRESS |
|---|---|---|
| MEC-A | MME-A | A.A.A.A |
| MEC-B | MME-A | B.B.B.B |
| MEC-C | MME-B | C.C.C.C |

FIG. 4C

USER INFORMATION

| TERMINAL | ENCRYPTION INFORMATION | HISTORY INFORMATION (MOVEMENT HISTORY, COMMUNICATION HISTORY) |
|---|---|---|
| UE-1 | 0xaaaa | ... |
| UE-2 | 0xbbbb | ... |
| UE-3 | 0xcccc | ... |

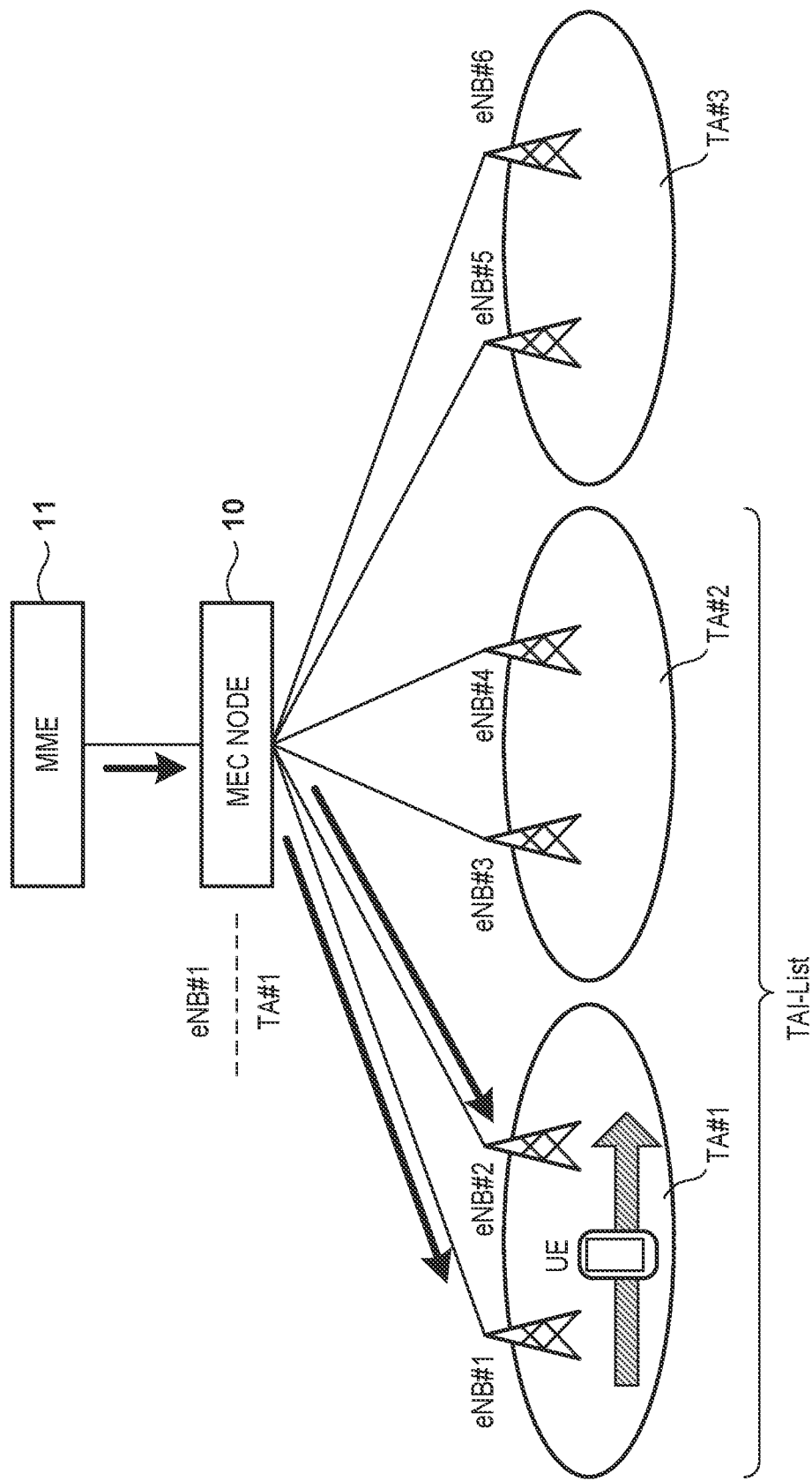

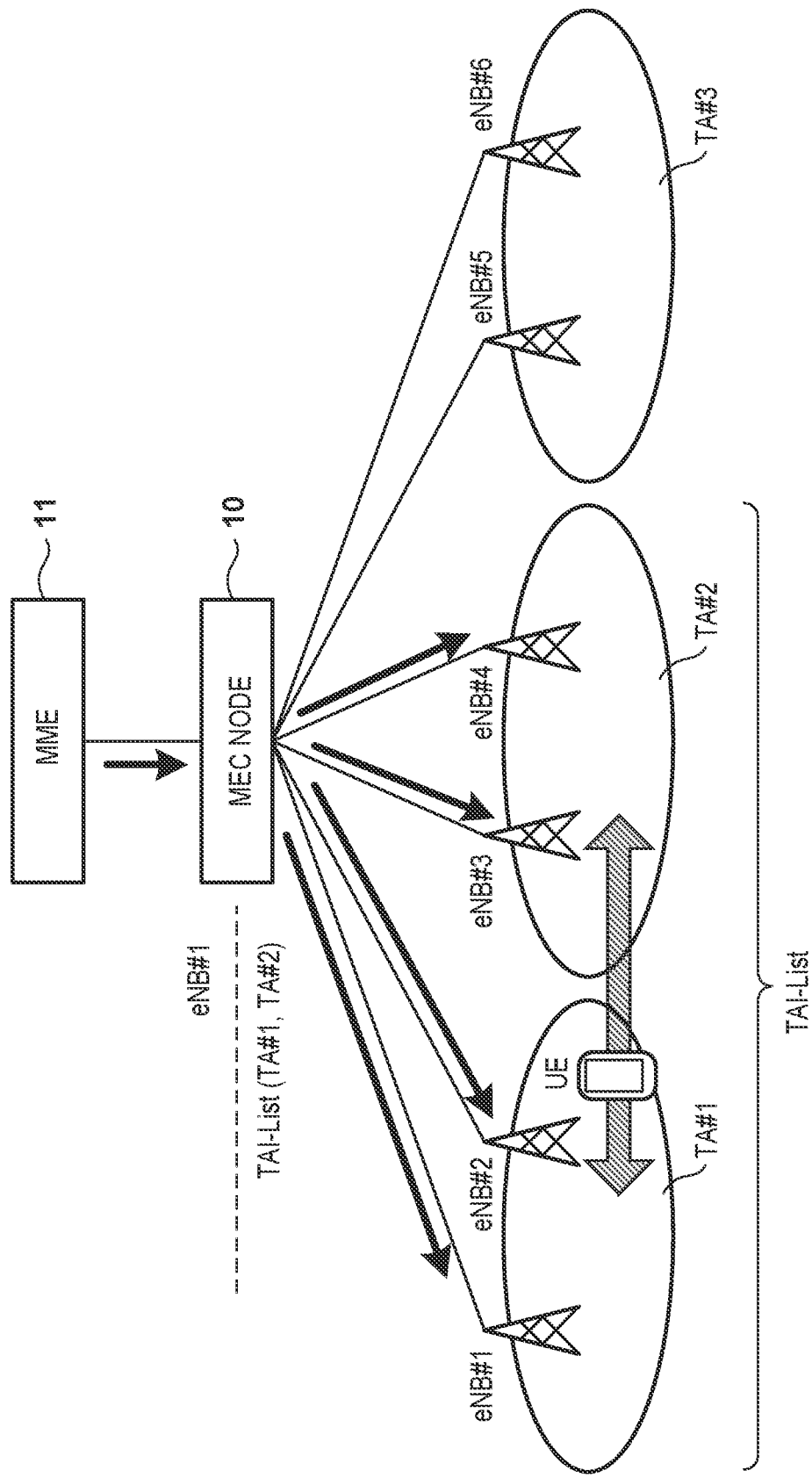

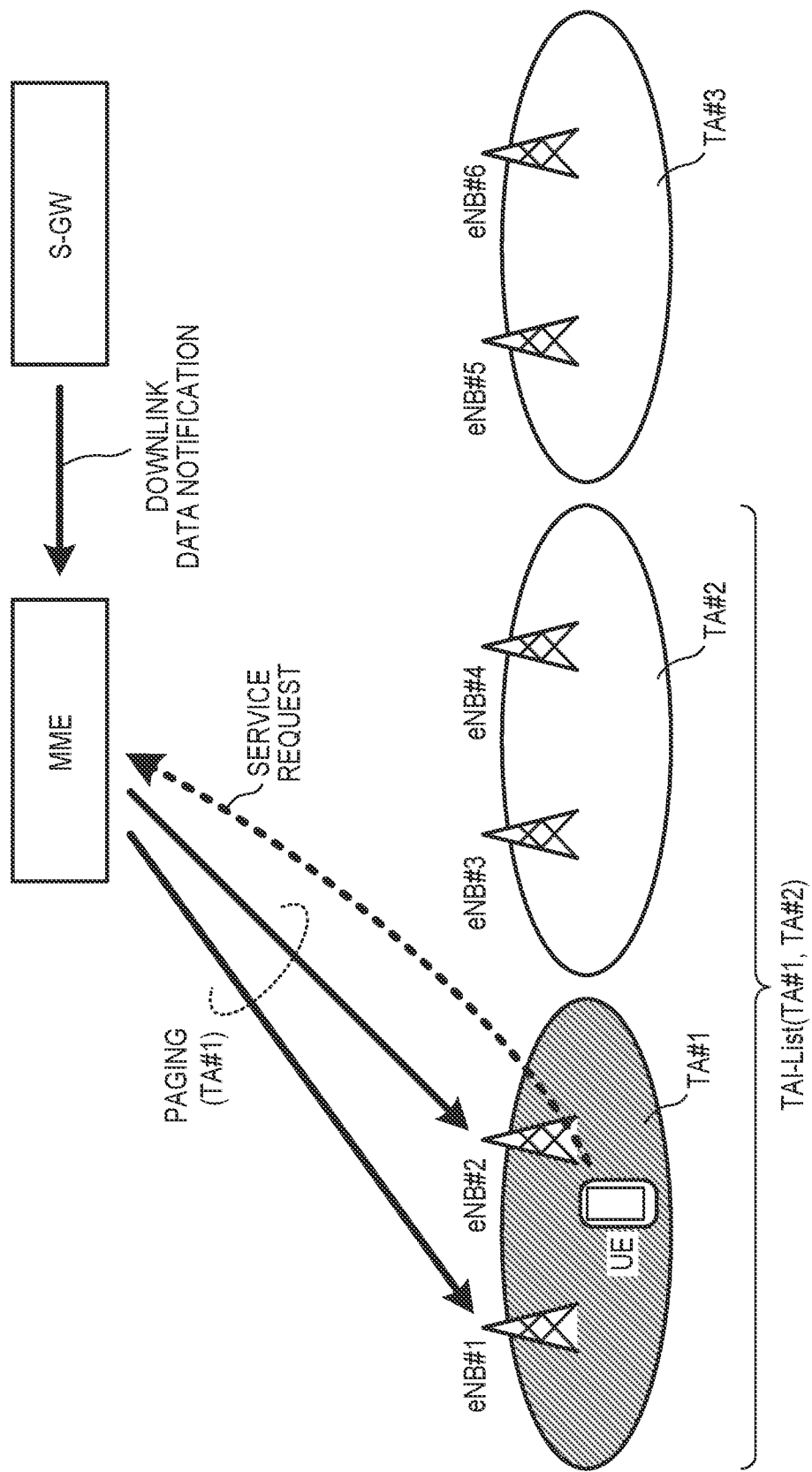

NODE APPARATUS IN A NETWORK, CONTROL METHOD THEREOF, AND STORAGE MEDIUM FOR CONTROL OF PAGING POLICY

CROSS-REFERENCE TO RELATED APPLICATION(S)

This application is a continuation of International Patent Application No. PCT/JP2018/018838 filed on May 16, 2018, which claims priority to and the benefit of Japanese Patent Application No. 2017-190864 filed on Sep. 29, 2017, the entire disclosures of which are incorporated herein by reference.

TECHNICAL FIELD

The present invention relates to a node apparatus for edge computing in a mobile network, a control method thereof, and a storage medium.

BACKGROUND ART

ETSI (the European Telecommunications Standards Institute) is in the process of standardizing Multi-access Edge Computing (MEC). When applying MEC to a mobile network, a node apparatus (an MEC node) that provides IT services to user equipment (UE) within a base station cell is provided near an edge of that network (e.g., between the base station and a core network). The MEC node uses, for example, a DPI (Deep Packet Inspection) technique for in-line identification and content analysis of packets transmitted between the base station and a core network node such as a gateway apparatus, and carries out processing using applications running on the MEC node as necessary.

In a mobile network such as that described above, when the network side starts communication with a UE, a mobility management apparatus such as an MME (Mobility Management Entity) carries out processing for calling (paging) the UE. The MME pages the UE through one or more base stations on the basis of location area information held in accordance with location registration from the UE. A paging range (paging area), which corresponds to a geographical area where the UE is paged, is determined in accordance with a predetermined policy (a paging policy).

For example, PTL 1 discloses a system that allocates an optimal paging area size on the basis of the movement frequency and communication frequency of each of wireless terminals (UEs). PTL 2 discloses a system that optimizes a paging area taking into account information unique to a radio access network (RAN) and UEs. PTL 3 discloses a system that decides on a paging area using a list of base stations in whose areas mobile stations are highly likely to be present, the list being created on the basis of results of predicting the mobility states of the mobile stations.

CITATION LIST

Patent Literature

PTL 1: Japanese Patent Laid-Open No. 2008-193592
PTL 2: Japanese Patent Laid-Open No. 2016-514935
PTL 3: International Publication No. 2014/049911

SUMMARY OF INVENTION

Technical Problem

The paging policy for the paging process is decided from the standpoint of balancing the transaction load involved in the MME paging process with the paging latency arising before the paging succeeds. As with the aforementioned conventional techniques, it is desirable that this paging policy be decided on as appropriate for each UE. For example, it may be appropriate to carry out paging over a broad range first for a UE with a high degree of movement, and carry out paging over a narrow range for a UE that remains stationary. It may also be appropriate to carry out paging over a broad range first for a UE using a voice service in order to reduce transmission latency, and gradually broaden the paging range from a narrow range for a UE using another kind of data communication service for which a certain degree of latency is permissible.

However, an MME that carries out a UE paging process normally handles a high number of UEs present in the cells formed by a high number of base stations which are handled by that MME. It is thus difficult to actually implement a paging process in which the MME collectively manages history information such as the movement history of each UE, and sets different paging policies for each UE on the basis of the history information, as in the aforementioned PTL 1-3. What is needed, therefore, is a system for increasing the scalability of the paging process so that paging policies can be controlled at the UE level, without increasing the transaction load involved with the paging process in an MME.

The present invention has been achieved in light of the above-described issue. The present invention provides a technique for controlling a paging process at the wireless terminal (UE) level in a mobile network by using edge computing.

Solution to Problem

According to one aspect of the present invention, there is provided a node apparatus for edge computing, the node apparatus being arranged between a plurality of base stations and a mobility management apparatus within a core network, the node apparatus comprising: an analysis unit that, by analyzing signaling information transmitted between each of the plurality of base stations and the mobility management apparatus, collects at least one of information indicating a mobility state and information indicating a communication state of a wireless terminal present within cells of the plurality of base stations; a decision unit that decides a paging range based on the information collected by the analysis unit upon receiving a paging message for paging the wireless terminal, the paging message having been transmitted by the mobility management apparatus to one or more base stations in accordance with a predetermined paging policy; and a transmission unit that transmits a paging message for paging the wireless terminal to each base station present in the paging range decided by the decision unit..

According to another aspect of the present invention, there is provided a node apparatus for edge computing, the node apparatus being arranged between a plurality of base stations and a mobility management apparatus within a core network, the node apparatus comprising: an obtainment unit that obtains information indicating a radio communication state within a cell of each of the plurality of base stations, from each of the plurality of base stations; a decision unit that decides a paging range based on the information obtained by the obtainment unit upon receiving a paging message for paging a wireless terminal within cells of the plurality of base stations, the paging message having been transmitted by the mobility management apparatus to one or more base stations in accordance with a predetermined paging policy; and a transmission unit that transmits a paging message for paging the wireless terminal to each base station present in the paging range decided by the decision unit..

According to still another aspect of the present invention, there is provided a control method for a node apparatus for edge computing, the node apparatus being arranged between a plurality of base stations and a mobility management apparatus within a core network, the method comprising: analyzing signaling information transmitted between each of the plurality of base stations and the mobility management apparatus and collecting at least one of information indicating a mobility state and information indicating a communication state of a wireless terminal present within cells of the plurality of base stations; deciding a paging range based on the information collected in the analyzing upon receiving a paging message for paging the wireless terminal, the paging message having been transmitted by the mobility management apparatus to one or more base stations in accordance with a predetermined paging policy; and transmitting a paging message for paging the wireless terminal to each base station present in the paging range decided in the deciding.

According to yet another aspect of the present invention, there is provided a non-transitory computer-readable storage medium storing a program for causing a computer to execute a control method for a node apparatus for edge computing, the node apparatus being arranged between a plurality of base stations and a mobility management apparatus within a core network, the method comprising: analyzing signaling information transmitted between each of the plurality of base stations and the mobility management apparatus and collecting at least one of information indicating a mobility state and information indicating a communication state of a wireless terminal present within cells of the plurality of base stations; deciding a paging range based on the information collected in the analyzing upon receiving a paging message for paging the wireless terminal, the paging message having been transmitted by the mobility management apparatus to one or more base stations in accordance with a predetermined paging policy; and transmitting a paging message for paging the wireless terminal to each base station present in the paging range decided in the deciding.

Advantageous Effects of Invention

According to the present invention, a paging process can be controlled at the wireless terminal (UE) level in a mobile network by using edge computing. Accordingly, the paging policy can be controlled at the wireless terminal level without affecting the operations of an existing mobility management apparatus.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The appended drawings, which are included in and constitute part of the specification, illustrate embodiments of the present invention, and along with those descriptions serve to illustrate the principles of the present invention.

FIG. 4A is a diagram illustrating an example of information managed by an MEC node (an information management unit).

FIG. 4B is a diagram illustrating an example of information managed by an MEC node (an information management unit).

FIG. 4C is a diagram illustrating an example of information managed by an MEC node (an information management unit).

FIG. 9A is a diagram illustrating an example of paging control carried out by an MEC node.

FIG. 9B is a diagram illustrating an example of paging control carried out by an MEC node.

FIG. 10 is a diagram illustrating an example of a paging process by an MME.

DESCRIPTION OF EMBODIMENTS

Hereinafter, exemplary embodiments of the present invention will be described with reference to the drawings. Note that constituent elements not necessary for the descriptions of the embodiments have been omitted from the drawings.

The embodiments described hereinafter assume an LTE/LTE-Advanced network as an example of a mobile network to which the present invention is applied. Note that the present invention may be applied in a mobile network aside from an LTE network. For example, the present invention may be applied in a fifth-generation (5G) mobile network, currently being standardized by the Third-Generation Partnership Project (3GPP).

<Network Configuration>

The LTE network assumed in the present embodiment is constituted by an E-UTRAN (Evolved Universal Terrestrial Radio Network), which is a radio access network, and an EPC (Evolved Packet Core), which is a core network. E-UTRAN is constituted by multiple base stations (base station devices). In LTE, a base station is called eNodeB (written "eNB" hereinafter). eNBs are connected to each other via an X2 interface. Each eNB is also connected directly to the EPC via an S1 interface. Note that both the X2 interface and the S1 interface are logical interfaces. The S1 interface is constituted by an S1-U interface for transmitting user plane (U-Plane) signals (user data), and an S1-MME interface for transmitting control signals. The S1-U interface connects each eNB to an S-GW (Serving Gateway), which is a gateway apparatus. The S1-MME interface connects each eNB to the MME (mobility management apparatus).

Figure 1:
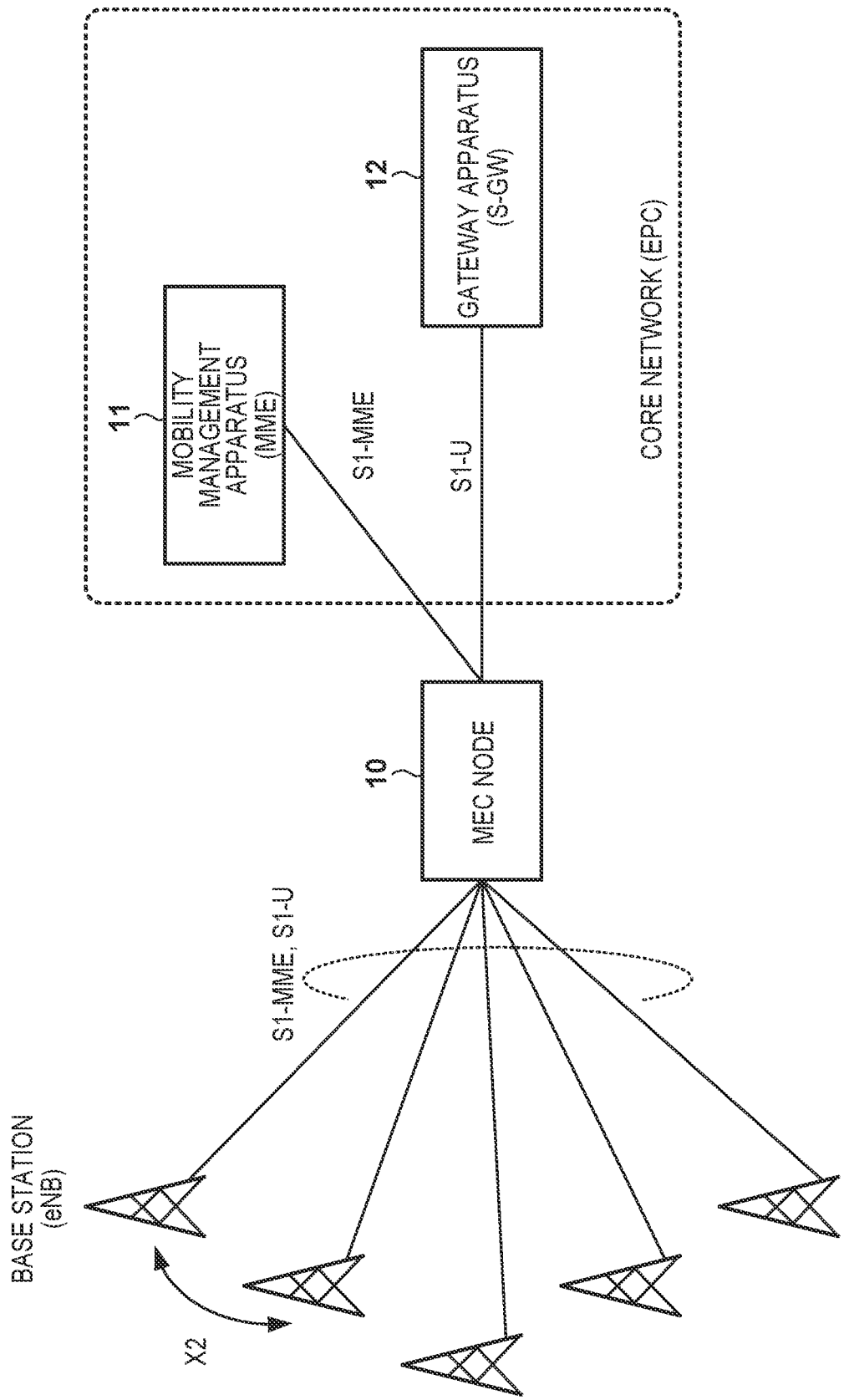
FIG. 1 is a diagram illustrating an example of the configuration of a network including an MEC node.

FIG. 1 is a diagram illustrating an example of the configuration of a network including an MEC node 10, which is a node apparatus according to the embodiment of the present invention. The MEC node 10 is a node apparatus for edge computing (MEC, in the present embodiment). FIG. 1 illustrates an MME 11 and an S-GW 12 of the EPC, as examples of the mobility management apparatus and the gateway apparatus, respectively, in the core network. Note that in 5G mobile networks, which are currently being standardized, the mobility management apparatus is called an AMF (Access and Mobility Management Function), and the gateway apparatus is called a UPF (User Plane Function).

As illustrated in FIG. 1, in the present embodiment, the MEC node 10 is arranged between a plurality of eNBs handled by the MME 11 and the EPC including the MME 11 (in a control channel between the eNBs and the MME 11). As a result, at least some of the many eNBs handled by the MME 11 are handled by the MEC node 10, and the MEC node 10 is handled by the MME 11. The MEC node 10 is configured to have a function (DPI function) for analyzing the content of packets (decoding the packets) transmitted between the eNBs and the EPC via the S1 interface (the S1-U interface or the S1-MME interface).

The MEC node 10 is not limited to handling five eNBs as illustrated in the example in FIG. 1, and is capable of handling any desired number of eNBs. Furthermore, a single MME 11 may handle a plurality of MEC nodes 10, each of which handles a different group of eNBs. Note that the example of the network configuration illustrated in FIG. 1 indicates the functional configuration, and does not necessarily indicate the physical configuration. For example, the MEC node 10 may be physically installed in the same housing as the gateway apparatus (S-GW or P-GW (Packet Data Network Gateway)).

Paging Process

An overview of a paging process in an LTE network, which is presupposed in the present embodiment, will be given here with reference to FIG. 10.

An MME manages a plurality of TAs (tracking areas) in order to manage the positions of wireless terminals (UEs). Each TA is a cell unit, constituted by one or more eNBs (one or more cells), indicating the position of the UE. The MME makes a list of one or more TAs for each UE, generates a TAI list (TAI-List), which is a list of identifiers (TAIs) of the one or more TAs, and assigns the list to the UE. The TAI list normally includes the TAI and so on of the TA where the UE was most recently located. In the example in FIG. 10, the MME manages three TAs (TA#1, TA#2, and TA#3), and assigns a TAI list including the TA#1 and the TA#2 to the UE.

The TAI list corresponds to an area (TA group) where it is not necessary to make location registration requests to the MME as long as a UE is present. When moving to a TA outside the TAI list, the UE sends a TAU (Tracking Area Update) Request (location registration request) message, in which the TA where the UE is present is set, to the MME via an eNB within that TA. The location area information indicating the TA where the UE is located, held by the MME, is updated as a result.

In an LTE network, when a user data packet is issued from an outside network such as the internet toward a UE, a downlink data notification is transmitted from the S-GW to the MME. Upon receiving the downlink data notification, the MME pages the corresponding UE on the basis of the location area information of that UE. Specifically, the MME transmits a paging message, for paging the corresponding UE, to one or more eNBs in accordance with a predetermined paging policy. In the example illustrated in FIG. 10, the paging is carried out to the TA#1, for which location registration has been carried out by the UE.

The eNB that has received the paging message from the MME transmits the paging message within the cell formed by that eNB. As illustrated in FIG. 10, in response to receiving the paging message from the eNB, the UE being paged transmits a service request message to the MME via eNB#2, which transmitted the paging message. As a result, a connection between the UE and the eNB#2 and a connection between the eNB#2 and the S-GW are established, and transmission of downlink and uplink data over those connections becomes possible.

The aforementioned paging policy used by the MME defines a paging range (paging area), frequency (time interval), and so on. The paging policy can define carrying out the paging in the order of, for example, (1) the eNB in whose area the UE was most recently located (Last eNB), (2) the TA for which the UE most recently registered the location (Last TA), and (3) the TAI list (TAI-List). Alternatively, it can be defined that the paging is to be carried out in the order of (1) Last TA, (2), TAI-List, and (3) TAI-List (i.e., after paging for the Last TA, paging is repeated twice for the TAI-List).

In the present embodiment, the MME 11 does not perform controlling of the paging policy at the UE level, and instead performs a paging process (i.e., a process for transmitting paging messages to one or more eNBs via the S1-MME interface) for each UE in accordance with a paging policy set in advance regardless of the UE. On the other hand, controlling (adjusting) of the paging policy at the UE level is implemented by the MEC node 10 provided between the eNBs and the MME 11.

Specifically, by analyzing signaling information transmitted between each of the plurality of eNBs and the MME 11, the MEC node 10 collects at least one of information indicating a mobility state and information indicating a communication state of a UE present within the cells of the plurality of eNBs. The MEC node 10 decides the paging range on the basis of the information collected as mentioned above, upon receiving a paging message for paging the UE, the paging message having been transmitted by the MME 11 to one or more eNBs in accordance with a predetermined paging policy. The MEC node 10 furthermore transmits a paging message for paging the UE to each of the eNBs present in the paging range which has been decided.

In this manner, the paging process is controlled at the UE level by using edge computing. As a result, the paging policy is implemented to be controlled at the UE level without increasing the transaction load involved in the paging process on the MME 11. In other words, the paging policy can be controlled (adjusted) at the UE level without affecting the operations of an existing mobility management apparatus (MME).

The following will describe an example of the configuration of an MEC node for realizing such a paging process, as well as a specific example of a processing sequence carried out by the MEC node.

<Configuration of MEC Node>

Figure 2:
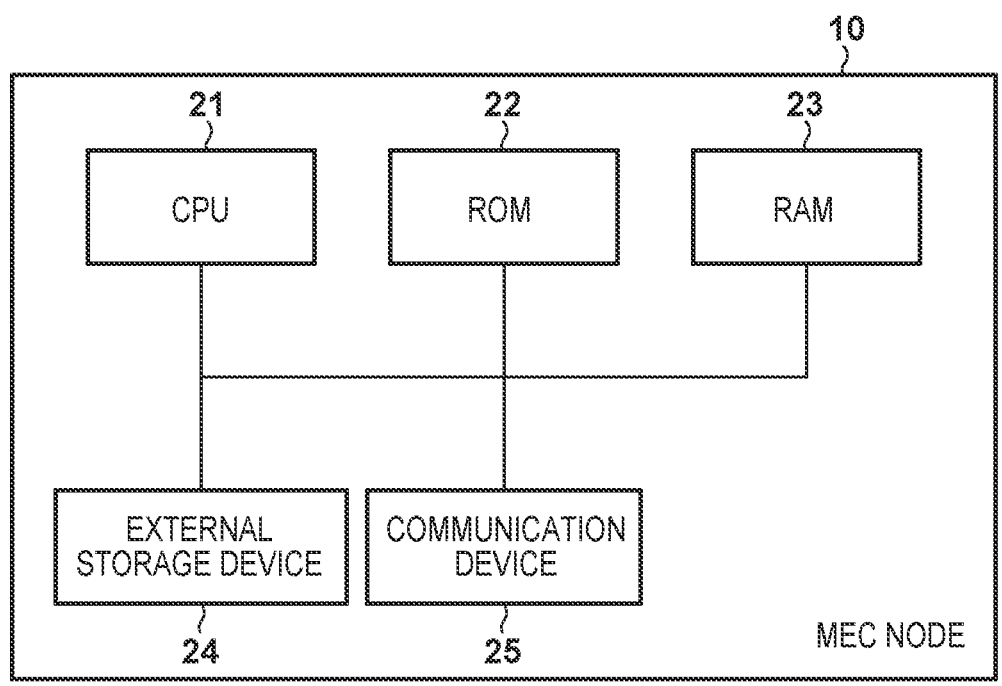
FIG. 2 is a block diagram illustrating an example of the hardware configuration of an MEC node.

FIG. 2 is a block diagram illustrating an example of the hardware configuration of the MEC node 10 according to the present embodiment. The MEC node 10 includes a CPU 21, ROM 22, RAM 23, an external storage device 24 (an HDD or the like), and a communication device 25 (a communication interface).

In the MEC node 10, programs for implementing the functions of the MEC node 10, which are stored in, for example, the ROM 22, the RAM 23, or the external storage device 24, are executed by the CPU 21. Note that the CPU 21 may be replaced with one or more processors such as an ASIC (Application-specific Integrated Circuit), an FPGA (Field Programmable Gate Array), a DSP (Digital Signal Processor), or the like.

The communication device 25 can, under the control of the CPU 21, transfer (receive and transmit) packets transmitted between the MME 11 or the S-GW 12 within the EPC and each of the eNBs handled by the MEC node 10, and can communicate with each of the eNBs (e.g., obtain local information from each of the eNBs). The communication device 25 can also communicate with other adjacent MEC nodes, under the control of the CPU 21. The MEC node 10 may include a plurality of communication devices 25 which are each connected to different destinations.

Note that the MEC node 10 may include dedicated hardware for executing the various functions, or some functions may be executed by hardware, with the rest executed by a computer running programs. Alternatively, all functions may be executed using a computer and programs.

Figure 3:
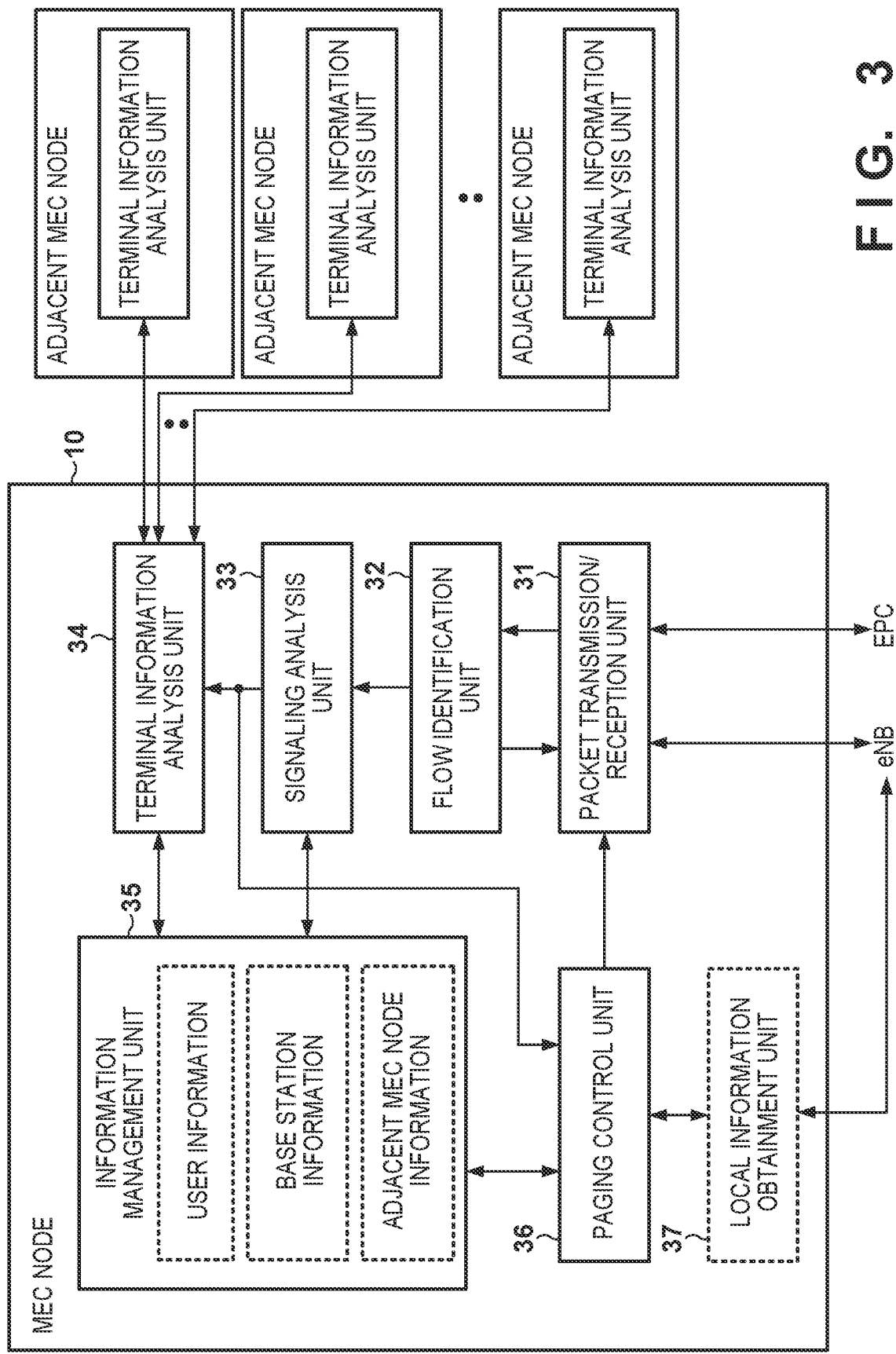
FIG. 3 is a block diagram illustrating an example of the functional configuration of an MEC node.

FIG. 3 is a block diagram illustrating an example of the functional configuration of the MEC node 10 according to the present embodiment. The functions of the MEC node 10 are logical functions realized by the hardware illustrated in FIG. 2, for example, and can be realized by the CPU 21 executing programs stored in the ROM 22 or the like. In the present embodiment, the MEC node 10 includes a packet transmission/reception unit 31, a flow identification unit 32, a signaling analysis unit 33, a terminal information analysis unit 34, an information management unit 35, and a paging control unit 36. Note that the MEC node 10 may further include a local information obtainment unit 37 for realizing a function for obtaining, from each of the eNBs handled, local information (e.g., information indicating the radio communication state of each eNB within the cell).

The packet transmission/reception unit 31 has a function for receiving packets transmitted between eNBs and the EPC, and a function for transmitting packets to the eNBs or the EPC. The flow identification unit 32 identifies the flow of the packets received by the packet transmission/reception unit 31. In the present embodiment, the flow identification unit 32 identifies whether the flow of a series of received packets is a flow of control packets (S1-MME packets) containing signaling information (control information) or a flow of data packets (S1-U packets) containing user data.

The signaling analysis unit 33 analyzes the signaling information contained in the packet received from any of the plurality of eNBs and the MME 11 to identify the UE for which the received packet is intended (the target UE) and the type of the message contained in the received packet. The signaling analysis unit 33 outputs the result of the identification to the terminal information analysis unit 34.

If the signaling information to be analyzed is encrypted, the signaling analysis unit 33 obtains, from the information management unit 35, encryption information (an encryption key) used by the identified target UE. Furthermore, the signaling analysis unit 33 uses the obtained encryption information to decrypt the encrypted signaling information pertaining to the target UE. In the present embodiment, this encryption information can be obtained from another adjacent MEC node by the terminal information analysis unit 34, as will be described later.

The terminal information analysis unit 34 collects information from the message contained in the received packets in accordance with the message type identified by the signaling analysis unit 33, and causes the information management unit 35 to hold (manage) the collected information. For example, if the above-stated message is a message related to an attach, location registration, or handover, the terminal information analysis unit 34 collects information indicating the mobility state of the target UE from that message. If the above-stated message is a message related to radio connection or radio release, the terminal information analysis unit 34 collects information indicating the communication state of the target UE from that message. A specific example of processing executed by the MEC node 10 in a case where a movement history of a UE is collected as the information indicating the mobility state and a communication history of a UE is collected as the information indicating the communication state will be described below.

The terminal information analysis unit 34 also has a function for obtaining the encryption information (encryption key) used by the target UE identified by the signaling analysis unit 33 from another adjacent MEC node. Specifically, on the basis of unencrypted signaling information contained in a received packet, the terminal information analysis unit 34 determines another MEC node by which the target UE had been handled immediately before being handled by the MEC node 10, and obtains the encryption information from the determined other node apparatus.

However, the MEC node determined on the basis of the signaling information may or may not have the encryption information, depending on the type of the message contained in the received packet. For example, if the message is a message pertaining to a location registration or a handover not involved with movement of the target UE between areas managed by different MMES, the MEC node determined on the basis of the signaling information has the encryption information. Thus in such a case, it is useful to determine another MEC node on the basis of the signaling information and attempt to obtain the encryption information.

The information management unit 35 manages base station information, adjacent MEC node information, and user information, examples of which are indicated in FIG. 4A to FIG. 4C, mentioned later. The information collected by the terminal information analysis unit 34 may be managed by the information management unit 35 as the user information. The information management unit 35 manages each piece of information in a state where each piece of information is stored in the external storage device 24.

The paging control unit 36 decides the paging range on the basis of the information collected by the terminal information analysis unit 34 and managed by the information management unit 35, upon receiving a paging message from the MME 11. The paging control unit 36 furthermore transmits a paging message to each of the eNBs present in the paging range which has been decided.

<Information Managed by Information Managing Unit>

Examples of the information managed by the information management unit 35 will be described next with reference to FIG. 4A to FIG. 4C. The information management unit 35 can manage each piece of information in table format, as indicated in FIG. 4A to FIG. 4C.

FIG. 4A is an example of the base station information managed by the information management unit 35. The base station information contains identification information of the base station (eNB); a TAI corresponding to the TA to which each eNB belongs, associated with that identification information; and information indicating the MEC node by which each eNB is handled. The base station information is information set in advance for the MEC node 10, and is used in a terminal registering process and so on, described later. Note that the base station information may be updated in response to changes to the network configuration (e.g., the addition of an eNB handled by the MEC node 10 or an adjacent MEC node).

FIG. 4B is an example of the adjacent MEC node information managed by the information management unit 35. The adjacent MEC node information contains, as the information of each MEC node adjacent to the MEC node 10, the MME by which each MEC node is handled, and an IP address assigned to each MEC node. The adjacent MEC node information is information set in advance for the MEC node 10, and is used in a terminal registering process and so on, described later. Note that the adjacent MEC node information may be updated in response to changes to the network configuration (e.g., the addition of an adjacent MEC node).

FIG. 4C is an example of the user information managed by the information management unit 35. The user information contains at least the encryption information and the history information for each wireless terminal (UE), and corresponds to information pertaining to a UE which is being or has been handled by the MEC node 10. The encryption information is NAS encryption information (an encryption key) used when decoding NAS (non-access layer) messages (which are transmitted and received between the UE and the MME 11 via an eNB) included in control packets received by the packet transmission/reception unit 31. The history information contains at least one of the movement history and communication history of the UE.

Here, NAS is a function layer in a protocol stack between the UE and the MME. A NAS message is transmitted as the payload of an S1AP (Application Protocol) message between the MME and the eNB, and as the payload of an RRC (Radio Resource Control) protocol message between the eNB and the UE. In this manner, the NAS message traverses the eNB having been encapsulated in a lower-layer message. NAS messages are encrypted by the transmitting node (the UE or the MME) using the NAS encryption information. Note that a flag indicating whether or not the NAS message is encrypted is added to the header part of the NAS message. Thus, whether or not the NAS message is encrypted can be identified by referring to the flag.

<MEC Node Processing Sequence>

Figure 5:
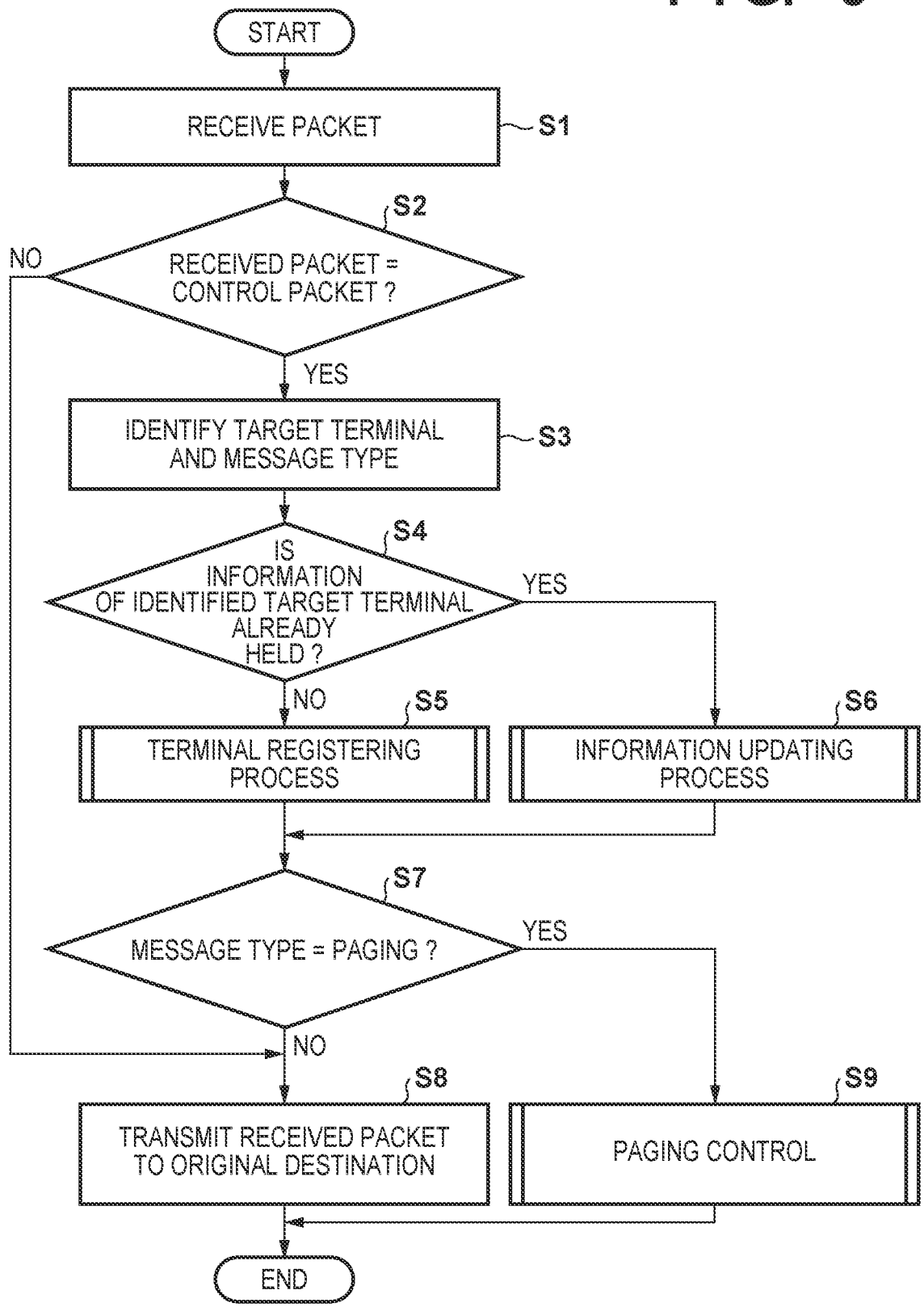
FIG. 5 is a flowchart illustrating a processing sequence executed by an MEC node.

FIG. 5 is a flowchart illustrating a processing sequence executed by the MEC node 10. In the MEC node 10, processing according to the sequence illustrated in FIG. 5 is executed each time a packet transmitted between the EPC and an eNB handled by the MEC node 10 is received by the packet transmission/reception unit 31. Note that the orders of execution of the processes in the steps of FIG. 5 to FIG. 8 are not limited to the illustrated orders, and the processes may be executed having changed the orders as desired.

First, in step S1, upon receiving a packed transmitted from the EPC or an eNB, the packet transmission/reception unit 31 outputs that received packet to the flow identification unit 32. Next, in step S2, the flow identification unit 32 performs the flow identification of the received packet. Specifically, the flow identification unit 32 determines whether or not the received packet is a control packet (an S1-MME packet), and advances the process to step S3 if the received packet is a control packet. On the other hand, if the received packet is not a control packet (i.e., is an S1-U packet containing user data), the flow identification unit 32 advances the process to step S8. In this case, in step S8, the packet transmission/reception unit 31 transmits (transfers) the received packet to the original destination designated in that received packet on the basis of the result of the flow identification made by the flow identification unit 32, and then ends the process.

In step S3, the signaling analysis unit 33 analyzes the signaling information contained in the received packet so as to identify the UE for which the received packet is intended (the target UE) and the type of the message contained in the received packet. The signaling analysis unit 33 outputs the result of the identification to the terminal information analysis unit 34. Note that in a case where encryption information necessary for analyzing encrypted signaling information is managed by the information management unit 35, the signaling analysis unit 33 uses that encryption information.

Next, in step S4, the terminal information analysis unit 34 determines whether or not the information of the identified target UE is already held (managed) by the information management unit 35 as user information, advancing the process to step S5 if the information is not held, and advancing the process to step S6 if the information is held. In step S5, the terminal information analysis unit 34 executes the terminal registering process for the target UE through the sequence illustrated in FIG. 6. On the other hand, in step S6, the terminal information analysis unit 34 executes the information updating process for the target UE through the sequence illustrated in FIG. 7. Upon completion of the process of step S5 or S6, the terminal information analysis unit 34 advances the process to step S7.

Upon completion of the terminal registering process (S5) or the information updating process (S6), in step S7, the paging control unit 36 determines whether or not the type of the message contained in the received packet is paging, on the basis of the result of the identification made by the signaling analysis unit 33. The paging control unit 36 advances the process to step S8 if the message type is not paging. In this case, in step S8, the packet transmission/reception unit 31 transmits (transfers) the received packet to the original destination designated in that received packet, and then ends the process. On the other hand, if the message type is paging, the paging control unit 36 advances the process to step S9 and executes paging control through the sequence illustrated in FIG. 8. After completion of the paging control, the paging control unit 36 ends the process carried out through the sequence illustrated in FIG. 5.

<Terminal Registering Process>

Figure 6:
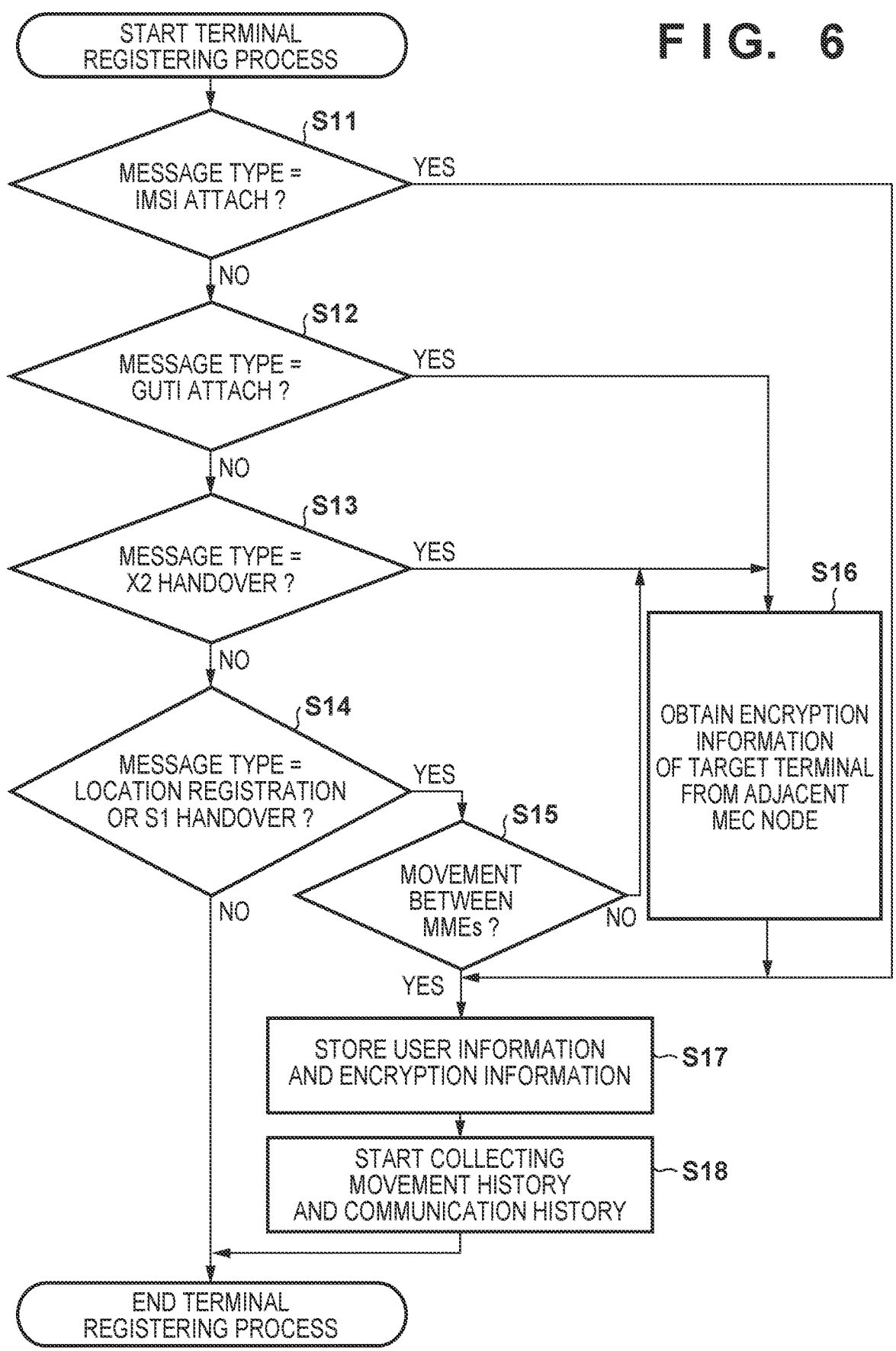
FIG. 6 is a flowchart illustrating a sequence in a terminal registering process (S5).

The sequence of the terminal registering process (S5) will be described next with reference to FIG. 6. The terminal registering process is a process for having the target UE handled by (registered with) the MEC node 10, by registering information of the target UE in the user information managed by the information management unit 35.

First, in steps S11 to S14, the terminal information analysis unit 34 determines the type of the message contained in the received packet on the basis of the result of the identification made by the signaling analysis unit 33, and then executes processing in accordance with the determined type. Specifically, the terminal information analysis unit 34 determines whether the message type is IMSI (International Mobile Subscriber Identity) attach, GUTI (Globally Unique Temporary Identifier) attach, X2 handover, S1 handover, or location registration. If the message type is none of these types, the terminal information analysis unit 34 ends the terminal registering process without carrying out processing based on the received packet.

IMSI Attach

If the message type is IMSI attach ("YES" in step S11), the terminal information analysis unit 34 advances the process to step S17. The IMSI attach, and the GUTI attach described later, can be determined on the basis of an Attach Request message, that the UE transmits to the MME 11 via an eNB in order to newly connect to the network (to register the UE with the network) when the UE is powered on or the like. Particularly, the IMSI attach request is made when the UE is first registered with the network, and thus the information of that UE is not held by an adjacent MEC node. The terminal information analysis unit 34 therefore advances the process to step S17 without carrying out the process of step S16.

GUTI Attach

If the message type is GUTI attach ("YES" in step S12), the terminal information analysis unit 34 advances the process to step S16. The encryption information of the target UE, which made the GUTI attach request, may be held by an adjacent MEC node. Thus in step S16, the terminal information analysis unit 34 makes an inquiry to an adjacent MEC node for the encryption information of the target UE, in an attempt to obtain the encryption information of the target UE from the adjacent MEC node.

Specifically, the terminal information analysis unit 34 refers to a "Last visited registered TAI" element within the Attach Request message, and obtains the TAI corresponding to the TA where the target UE was most recently (last) present. Furthermore, on the basis of the base station information managed by the information management unit 35, the terminal information analysis unit 34 determines the handling MEC node associated with the obtained TAI, as the MEC node that most recently handled the target UE, and makes an inquiry with that MEC node. If the TAI corresponding to the TA where the target UE was most recently present cannot be obtained, the terminal information analysis unit 34 estimates one or more MEC nodes where the target UE was most recently present on the basis of a GUTI held in an "Additional GUTI" element within the Attach Request message. The terminal information analysis unit 34 furthermore makes an inquiry to each of the estimated MEC nodes. The terminal information analysis unit 34 then advances the process to step S17.

X2 Handover

If the message type is X2 handover ("YES" in step S13), the terminal information analysis unit 34 advances the process to step S16. An X2 handover is a handover made between eNBs belonging to the same MME 11. In an X2 handover, control messages are transmitted and received via the X2 interface between the handover source eNB and the handover destination eNB, and a Path Switch Request message is transmitted from the handover destination eNB to the MME 11. The X2 handover can be determined on the basis of this Path Switch Request message.

In step S16, the terminal information analysis unit 34 attempts to obtain the encryption information of the target UE from an adjacent MEC node, as described above. Specifically, if a "Source MME GUMMEI" element within the Path Switch Request message contains information, the terminal information analysis unit 34 determines the MME which last handled the target UE. Furthermore, on the basis of the adjacent MEC node information managed by the information management unit 35, the terminal information analysis unit 34 estimates the handling MEC node associated with the determined MME as one or more MEC nodes that most recently handled the target UE. The terminal information analysis unit 34 then makes an inquiry to each of the estimated MEC nodes. On the other hand, if the "Source MME GUMMEI" element within the Path Switch Request message does not contain information, the terminal information analysis unit 34 makes an inquiry with all adjacent MEC nodes on the basis of the adjacent MEC node information managed by the information management unit 35. The terminal information analysis unit 34 then advances the process to step S17.

Location Registration or 51 Handover

If the message type is location registration or S1 handover ("YES" in step S14), the terminal information analysis unit 34 advances the process to step S15. The location registration can be determined on the basis of a TAU Request message from the UE to the MME 11, and the S1 handover can be determined on the basis of a Handover Request message transmitted from the MME 11 to the handover destination eNB. In step S15, the terminal information analysis unit 34 determines whether or not the location registration or the S1 handover involves movement of the target UE between MMEs, advances the process to step S17 if so, and to step S16 if not.

If a location registration or S1 handover that does not involve movement between MMES is carried out, it may be possible to obtain the encryption information of the target UE from the MEC node that most recently handled the target UE. Thus in step S16, the terminal information analysis unit 34 attempts to obtain the encryption information of the target UE from an adjacent MEC node, as described above. Note that the encryption information may be obtained from information exchanged between the target UE and a new MME to be connected to, if a location registration or S1 handover involving movement between MMEs is carried out.

Specifically, if the message type is location registration, the terminal information analysis unit 34 refers to a "Last visited registered TAI" element within the TAU Request message, and obtains the TAI corresponding to the TA where the target UE was most recently (last) present. Furthermore, on the basis of the base station information managed by the information management unit 35, the terminal information analysis unit 34 determines the handling MEC node associated with the obtained TAI as the MEC node that most recently handled the target UE, and makes an inquiry with that MEC node. If the TAI corresponding to the TA where the target UE was most recently present cannot be obtained, the terminal information analysis unit 34 estimates one or more MEC nodes where the target UE was most recently present on the basis of a GUTI held in an "Old GUTI" element within the TAU Request message. The terminal information analysis unit 34 furthermore makes an inquiry to each of the estimated MEC nodes. The terminal information analysis unit 34 then advances the process to step S17.

Meanwhile, if the message type is S1 handover, the terminal information analysis unit 34 refers to "Last Visited Cell Information" contained in a "Source eNB to Target eNB Transparent Container" element within the Handover Request message, and obtains an ECGI (E-UTRAN Cell Global Identifier) corresponding to the eNB that most recently handled the target UE. Furthermore, on the basis of the base station information managed by the information management unit 35, the terminal information analysis unit 34 determines the MEC node that most recently handled the eNB indicated by the obtained ECGI, and makes an inquiry with that MEC node. The terminal information analysis unit 34 then advances the process to step S17.

In step S17, the terminal information analysis unit 34 causes the information management unit 35 to store the user information collected from the signaling information contained in the received packet. Additionally, if encryption information has been obtained successfully from the adjacent MEC node in step S16, the terminal information analysis unit 34 causes the information management unit 35 to store the obtained encryption information. Then, in step S18, the terminal information analysis unit 34 starts collecting the movement history and the communication history for the target UE, and ends the terminal registering process.

Note that the movement history and the communication history can be obtained in accordance with the message type of the received packet, as will be described later using FIG. 7.

<Information Updating Process>

The sequence of the information updating process (S6) will be described next with reference to FIG. 7. The information updating process is a process for updating the movement history or the communication history of the target UE, which is managed as user information by the information management unit 35, on the basis of a received packet.

First, in steps S21 to S22, the terminal information analysis unit 34 determines the type of the message contained in the received packet, and then executes processing in accordance with the determined type. Specifically, the terminal information analysis unit 34 determines whether the message type is radio connection, radio release, X2 handover, S1 handover, or location registration. If the message type is none of these types, the terminal information analysis unit 34 ends the information updating process without carrying out processing based on the received packet.

Radio Connection or Release

If the message type is radio connection or release ("YES" in step S21), the terminal information analysis unit 34 advances the process to step S23. Radio connection can be determined, for example, on the basis of an Initial UE Message, which is an S1AP message transmitted from an eNB to the MME 11. The Initial UE Message is a message for establishing an S1 connection between an eNB and the MME 11. Radio release can be determined, for example, on the basis of a UE Context Release Request, which is an S1AP message transmitted from an eNB to the MME 11. The UE Context Release Request is a message for terminating an S1 connection between an eNB and the MME 11.

In step S23, on the basis of the details and issue time of the message contained in the packet received by the packet transmission/reception unit 31, the terminal information analysis unit 34 updates the UE communication history managed by the information management unit 35. For example, the terminal information analysis unit 34 may save, in accordance with the radio connection, the time at which the UE started communication, in the communication history, and can save, in accordance with the radio release, the time at which the UE stopped communication, in the communication history. Note that the terminal information analysis unit 34 can also include the details of the communication in the communication history by analyzing other messages transmitted between the eNB and the MME 11. Upon completion of the updating of the communication history, the terminal information analysis unit 34 ends the information updating process.

X2 Handover, S1 Handover, or Location Registration

If the message type is X2 handover, S1 handover, or location registration ("YES" in step S22), the terminal information analysis unit 34 moves the process to step S24. In step S24, on the basis of the details and issue time of the message contained in the packet received by the packet transmission/reception unit 31, the terminal information analysis unit 34 updates the UE movement history managed by the information management unit 35. For example, the terminal information analysis unit 34 may obtain, as location information, information (an ID or the like) indicating the eNBs corresponding to the handover source cell and the handover destination cell, respectively, from the received packet, and save that information, along with the time the received packet was issued, in the movement history. Additionally, the terminal information analysis unit 34 obtains, as the location information, the TAI corresponding to the TA with which the UE carries out the location registration from the received packet, and saves that information, along with the time the received packet was issued, in the movement history. Upon completion of the updating of the movement history, the terminal information analysis unit 34 ends the information updating process.

Figure 7:
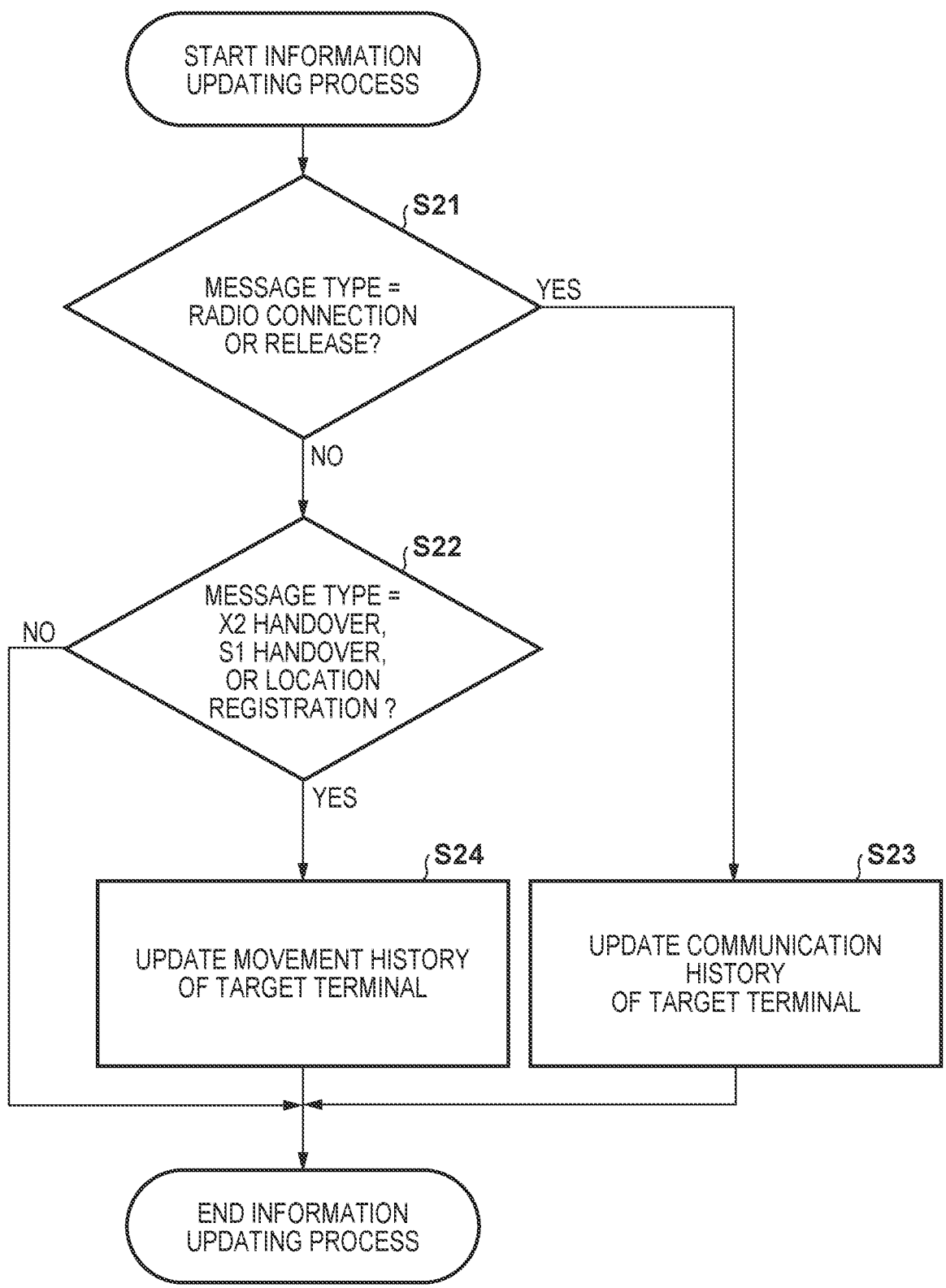
FIG. 7 is a flowchart illustrating a sequence in an information updating process (S6).

Although not illustrated in the example of FIG. 7, if a packet containing an Attach Request message has been received, the terminal information analysis unit 34 may update the movement history on the basis of the details of the message and the time at which the message was issued.

<Paging Control>

Figure 8:
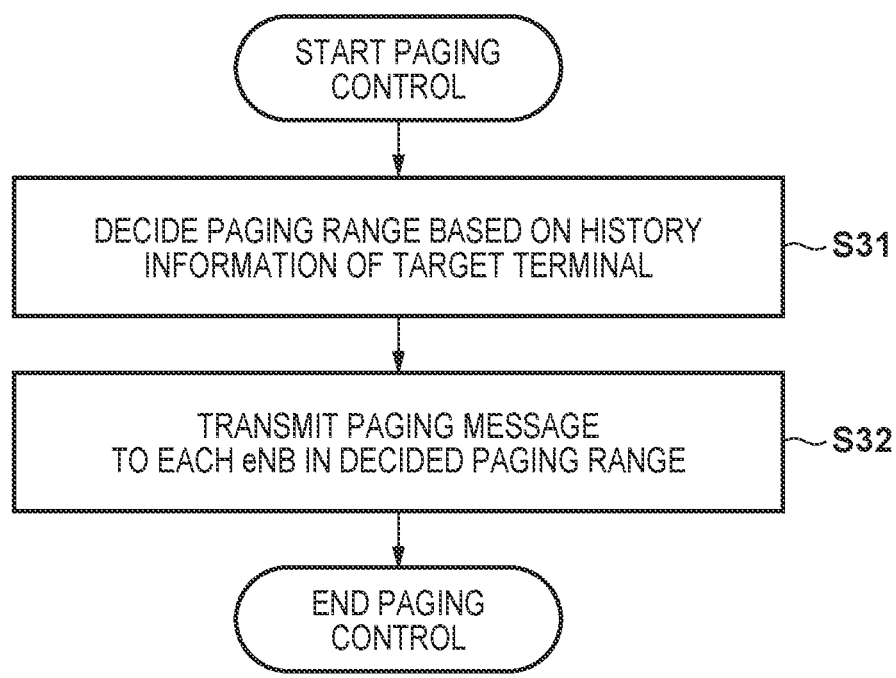
FIG. 8 is a flowchart illustrating a sequence in paging control (S9).

Next, the sequence of the paging control (S9) will be described with reference to FIG. 8. The paging control unit 36 starts the paging control through the sequence illustrated in FIG. 8 upon receiving a paging message for paging the target UE, transmitted by the MME 11 toward one or more eNBs in accordance with a predetermined paging policy. The paging control is executed in order to control the paging process for the target UE, started by the MME 11.

First, in step S31, on the basis of the history information (at least one of the movement history and the communication history) of the target UE managed by the information management unit 35, the paging control unit 36 decides a paging range that includes one or more eNBs to which a paging message is to be transmitted. For example, a movement direction or movement destination location may be predicted on the basis of the movement history and the communication history, and eNBs near a position within the movement direction or the movement destination location may be included in the paging range. Alternatively, if the terminal information analysis unit 34 has collected a paging success rate of the target UE as the communication history, the paging control unit 36 may decide on the paging range on the basis of the paging success rate.

Next, in step S32, the paging control unit 36 transmits the paging message for paging the target UE to each eNB in the paging range decided in step S31, and then ends the process. Note that if the paging has failed, the paging control unit 36 may repeat the transmission of the paging message multiple times. In this case, the paging control unit 36 may transmit the paging message to all of the eNBs in the TAI list (TAI-List) assigned to the target UE in one transmission among the multiple transmissions. This makes it possible for the paging to succeed even if an eNB in whose area the target UE is located has been omitted from the paging range due to the paging range being adjusted by the paging control unit 36.

Figure 9C:
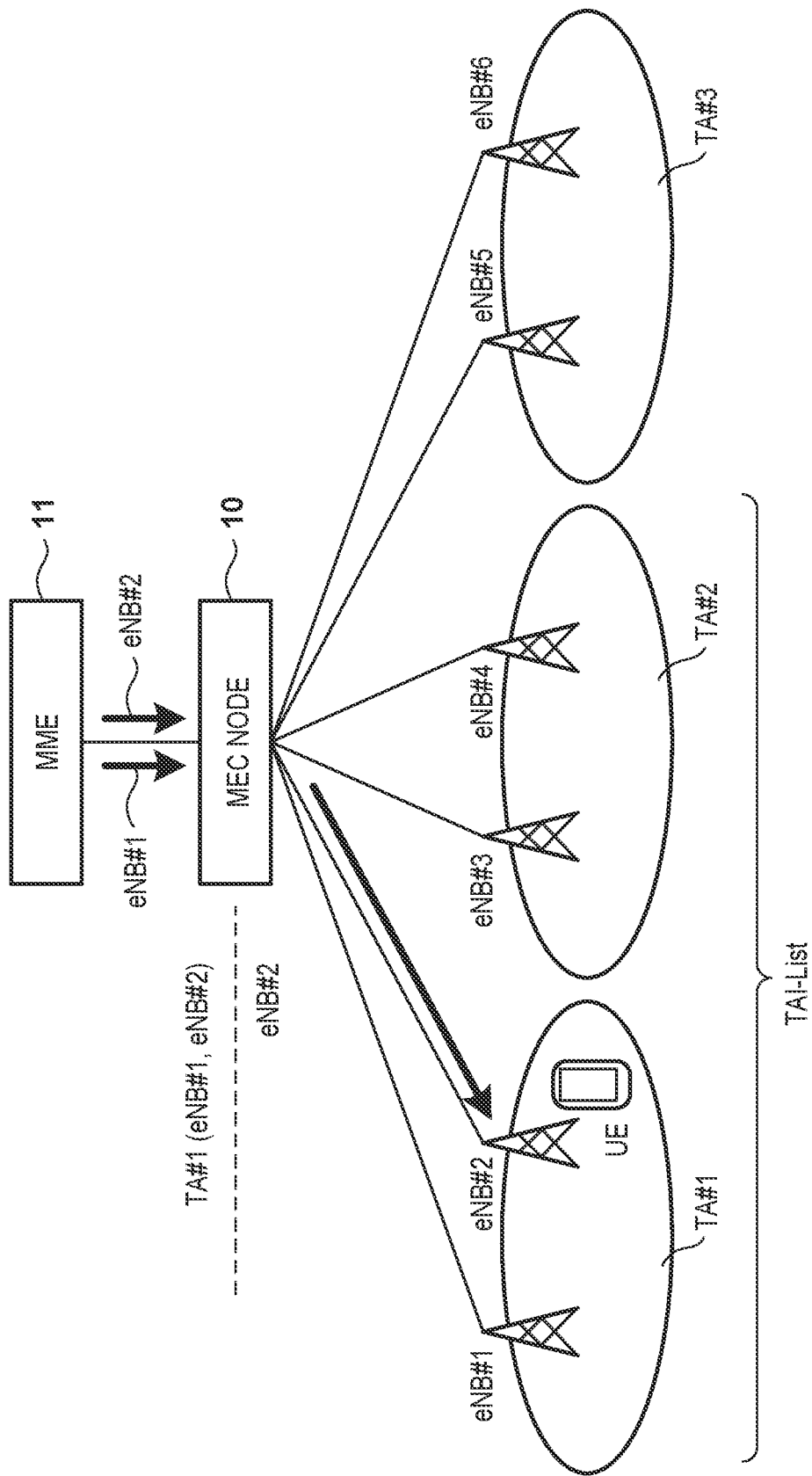
FIG. 9C is a diagram illustrating an example of paging control carried out by an MEC node.

FIG. 9A to FIG. 9C are diagrams illustrating specific examples of the above-described paging control. FIG. 9A and FIG. 9B illustrate examples in which the paging range set by the paging policy of the MME 11 is broadened by the MEC node 10. FIG. 9C illustrates an example in which the paging range set by the paging policy of the MME 11 is narrowed by the MEC node 10.

The example of FIG. 9A assumes a scenario in which the UE is a vehicle-mounted terminal or the like and continues moving at a certain speed within TA#1. In this example, the MME 11 transmits a paging message to the Last eNB (eNB#1, in this example) for the UE to be paged (the target UE) in accordance with a pre-set paging policy. In response, the MEC node 10 decides, on the basis of the movement history and the communication history of the target UE, that the paging range should be the Last TA (TA#1, in this example), which is broader, and transmits the paging message to the eNB#1 and the eNB#2 present in the TA#1. In other words, the MEC node 10 adjusts the paging range of the MME 11 to a broader range and transmits the paging message. Note that the MEC node 10 may decide on the TAI-List, which is broader than the Last TA, as the paging range.

The example of FIG. 9B assumes a scenario in which a UE is moving frequently near the cell boundary between adjacent eNB#2 and eNB#3. As in the example of FIG. 9A, in this example, the MME 11 transmits a paging message to the Last eNB (eNB#1, in this example) for the UE to be paged (the target UE) in accordance with a pre-set paging policy. In response, the MEC node 10 decides, on the basis of the movement history and the communication history of the target UE, that the paging range should be the TAI-List (TA#1 and TA#2, in this example), which is broader, and transmits the paging message to the eNB#1, eNB#2, eNB#3, and eNB#4 present within the TAI-List. In other words, the MEC node 10 adjusts the paging range of the MME 11 to a broader range and transmits the paging message.

The example of FIG. 9C assumes a scenario in which the UE is a stationary IoT terminal or the like and remains substantially stationary within the cell of the eNB#2. In this example, the MME 11 transmits a paging message to the Last TA (TA#1, in this example) for the UE to be paged (the target UE) in accordance with a pre-set paging policy. In response, the MEC node 10 decides, on the basis of the movement history and the communication history of the target UE, that the paging range should be the Last eNB (eNB#2, in this example), which is narrower, and transmits the paging message to the eNB#2. In other words, the MEC node 10 adjusts the paging range of the MME 11 to a narrower range and transmits the paging message.

According to the present embodiment as described thus far, by using the MEC node 10 to control the paging process at the UE level, paging policies can be controlled at the UE level without increasing the transaction load involved in the paging process on the MME 11. In other words, the paging policy can be controlled (adjusted) at the UE level without affecting the operations of an existing mobility management apparatus (MME). Additionally, by controlling the paging process in accordance with the mobility state and communication state of the UE, transmission amount, response time, and so on of the paging messages can be improved. Furthermore, the number of UEs handled by the MEC node 10 is kept lower than that for the MME 11, which makes it possible to introduce more complex processing (computations and the like) for controlling the paging process and realize more accurate paging processes.

<Other Embodiments>

Many variations can be made on the foregoing embodiment. For example, the MEC node 10 may include the local information obtainment unit 37, as indicated in FIG. 3. The local information obtainment unit 37 has a function for obtaining information indicating the radio communication state within the cell of each eNB handled by the MEC node 10 from each eNB as local information. In this case, the paging control unit 36 decides the paging range on the basis of the local information collected by the terminal information analysis unit 34 upon receiving a paging message from the MME 11. Alternatively, the paging control unit 36 may decide the paging range on the basis of both the information managed by the information management unit 35 and the local information. The paging control unit 36 furthermore transmits a paging message to each of the eNBs present in the paging range which has been decided. Through this processing, the MEC node 10 can adjust the paging policy on the basis of a local state within the cell of each eNB.

Note that the MEC node (management apparatus) according to the present embodiment can be realized by a computer program for causing a computer to function as the MEC node. The computer program may be stored in a computer-readable storage medium and distributed in such a state, or may be distributed over a network.

The present invention is not limited to the above embodiments and various changes and modifications can be made within the spirit and scope of the present invention. Therefore, to apprise the public of the scope of the present invention, the following claims are made.

The invention claimed is:

1. A node apparatus for edge computing, the node apparatus being arranged between a plurality of base stations and a mobility management apparatus within a core network, the node apparatus comprising:
at least one processor circuit with a memory comprising instructions, that when executed by the processor circuit, cause the at least one processor circuit to at least:
analyze signaling information contained in a control packet that is transmitted between each of the plurality of base stations and the mobility management apparatus, and collect, based on a result of analyzing the signaling information contained in the control packet whose destination is either each of the plurality of base stations or the mobility management apparatus and whose message type is not paging, at least one of information indicating a mobility state and information indicating a communication state of a wireless terminal present within cells of the plurality of base stations;
decide a paging range based on the information collected based on the result of analyzing the signaling information contained in the control packet whose destination is either each of the plurality of base stations or the mobility management apparatus and whose message type is not paging, upon receiving a paging message for paging the wireless terminal, the paging message having been transmitted by the mobility management apparatus toward one or more base stations in accordance with a predetermined paging policy; and
transmit a paging message for paging the wireless terminal to each base station present in the paging range decided based on the information collected.

2. The node apparatus according to claim 1, wherein the instructions, that when executed by the processor circuit, cause the at least one processor circuit to at least:
analyze signaling information included in a packet received from the plurality of base stations or the mobility management apparatus to identify a type of a message included in the packet, and collect information from the message in accordance with the identified type.

3. The node apparatus according to claim 2, wherein
when the message is a message related to an attach, location registration, or handover, the instructions, that when executed by the processor circuit, cause the at least one processor circuit to at least collect information indicating the mobility state from the message.

4. The node apparatus according to claim 2, wherein
when the message is a message related to radio connection or radio release, the instructions, that when executed by the processor circuit, cause the at least one processor circuit to at least collect information indicating the communication state from the message.

5. The node apparatus according to claim 2, wherein
the node apparatus can communicate with another adjacent node apparatus; and
the instructions, that when executed by the processor circuit, cause the at least one processor circuit to at least obtain an encryption key used by the wireless terminal from another node apparatus and decode encrypted signaling information pertaining to the wireless terminal using the obtained encryption key.

6. The node apparatus according to claim 5, wherein
based on unencrypted signaling information, the instructions, that when executed by the processor circuit, cause the at least one processor circuit to at least determine another node apparatus by which the wireless terminal was handled immediately before the wireless terminal is handled by the node apparatus, and obtain the encryption key from the determined other node apparatus.

7. The node apparatus according to claim 5, wherein
in a case where the message is a message pertaining to a location registration or a handover that does not involve movement of the wireless terminal between areas managed by different mobility management apparatuses, the instructions, that when executed by the processor circuit, cause the at least one processor circuit to at least determine based on unencrypted signaling information, another node apparatus by which the wireless terminal was handled immediately before the wireless terminal is handled by the node apparatus, and obtain the encryption key from the determined other node apparatus.

8. The node apparatus according to claim 1, wherein
in a case where the paging message is repeatedly transmitted multiple times, the instructions, that when executed by the processor circuit, cause the at least one processor circuit to at least transmit in one transmission among the multiple transmissions, the paging message to all base stations within an area assigned to the wireless terminal as an area in which location registration need not be carried out for the mobility management apparatus as long as the wireless terminal is present.

9. The node apparatus according to claim 1, wherein
the instructions, that when executed by the processor circuit, cause the at least one processor circuit to at least collect a movement history of the wireless terminal as information indicating the mobility state, and collect a communication history of the wireless terminal as information indicating the communication state.

10. The node apparatus according to claim 9, wherein
the instructions, that when executed by the processor circuit, cause the at least one processor circuit to at least predict a movement direction or movement destination location of the wireless terminal based on the movement history and the communication history, and include in the paging range a base station near a position within the movement direction or the movement destination location.

11. The node apparatus according to claim 9, wherein the instructions, that when executed by the processor circuit, cause the at least one processor circuit to at least:
collect a paging success rate of the wireless terminal as the communication history; and
decide the paging range based on the paging success rate.

12. The node apparatus according to claim 1, wherein the instructions, that when executed by the processor circuit, further cause the at least one processor circuit to at least:
obtain information indicating a radio communication state within a cell of each of the plurality of base stations, from each of the plurality of base stations,
wherein the paging range is decided based on the information collected.

13. A control method for a node apparatus for edge computing, the node apparatus being arranged between a plurality of base stations and a mobility management apparatus within a core network, the method comprising:
analyzing signaling information contained in a control packet that is transmitted between each of the plurality of base stations and the mobility management apparatus and collecting, based on a result of analyzing the signaling information contained in the control packet whose destination is either each of the plurality of base stations or the mobility management apparatus and whose message type is not paging, at least one of information indicating a mobility state and information indicating a communication state of a wireless terminal present within cells of the plurality of base stations;
deciding a paging range based on the information collected in the analyzing based on the result of analyzing the signaling information contained in the control packet whose destination is either each of the plurality of base stations or the mobility management apparatus and whose message type is not paging, upon receiving a paging message for paging the wireless terminal, the paging message having been transmitted by the mobility management apparatus toward one or more base stations in accordance with a predetermined paging policy; and
transmitting a paging message for paging the wireless terminal to each base station present in the paging range decided in the deciding.

14. A non-transitory computer-readable storage medium storing a program for causing a computer to execute a control method for a node apparatus for edge computing, the node apparatus being arranged between a plurality of base stations and a mobility management apparatus within a core network, the method comprising:
analyzing signaling information contained in a control packet that is transmitted between each of the plurality of base stations and the mobility management apparatus and collecting, based on a result of analyzing the signaling information contained in the control packet whose destination is either each of the plurality of base stations or the mobility management apparatus and whose message type is not paging, at least one of information indicating a mobility state and information indicating a communication state of a wireless terminal present within cells of the plurality of base stations;
deciding a paging range based on the information collected in the analyzing based on the result of analyzing the signaling information contained in the control packet whose destination is either each of the plurality of base stations or the mobility management apparatus and whose message type is not paging, upon receiving a paging message for paging the wireless terminal, the paging message having been transmitted by the mobility management apparatus toward one or more base stations in accordance with a predetermined paging policy; and
transmitting a paging message for paging the wireless terminal to each base station present in the paging range decided in the deciding.

* * * * *